(12) United States Patent
Quemeneur

(10) Patent No.: US 9,862,130 B2
(45) Date of Patent: Jan. 9, 2018

(54) FLEXIBLE TUBE COMPRISING AN ELECTRONIC COMPONENT

(75) Inventor: Alan Quemeneur, Tinqueux (FR)

(73) Assignee: Cebal S.A.S., Gennevilliers (FR)

( * ) Notice: Subject to any disclaimer, the term of this patent is extended or adjusted under 35 U.S.C. 154(b) by 620 days.

(21) Appl. No.: 13/449,360

(22) Filed: Apr. 18, 2012

(65) Prior Publication Data

US 2012/0204991 A1    Aug. 16, 2012

Related U.S. Application Data

(62) Division of application No. 10/596,067, filed as application No. PCT/FR2004/003004 on Nov. 24, 2004, now abandoned.

(30) Foreign Application Priority Data

Nov. 28, 2003 (FR) .................................. FR0313999
Jan. 23, 2004 (FR) .................................. FR0400644

(51) Int. Cl.
   *B65D 35/24*     (2006.01)
   *B65D 35/02*     (2006.01)
   *G06K 19/00*     (2006.01)
   *F16L 11/00*     (2006.01)
   *B29C 45/14*     (2006.01)
   *B29L 23/20*     (2006.01)

(52) U.S. Cl.
   CPC ........ *B29C 45/14598* (2013.01); *B65D 35/24* (2013.01); *B29C 2045/14852* (2013.01); *B29L 2023/20* (2013.01); *B65D 2203/10* (2013.01); *Y10T 29/49204* (2015.01)

(58) Field of Classification Search
   CPC ..... B29C 2045/14852; B29C 45/14598; B29L 2023/20; B65D 2203/10; B65D 35/24; Y10T 29/49204
   USPC ............ 428/35.7, 36.9, 36.91, 34.1; 138/109
   See application file for complete search history.

(56) References Cited

U.S. PATENT DOCUMENTS

| | | |
|---|---|---|
| 3,778,685 A | 12/1973 | Kennedy |
| 5,944,206 A | 8/1999 | Culter et al. |
| 6,087,198 A | 7/2000 | Panasik |
| 6,129,653 A | 10/2000 | Fredricks et al. |
| 6,482,287 B1 | 11/2002 | De Gaulle |
| 2002/0183883 A1 | 12/2002 | Carr |

FOREIGN PATENT DOCUMENTS

| | | |
|---|---|---|
| DE | 20219199 U | 2/2003 |
| DE | 10218417 | * 11/2003 |
| DE | 10218417 A | 11/2003 |
| EP | 0697342 A | 2/1996 |
| FR | 2622543 A3 | 5/1989 |
| WO | WO01/34488 A | 5/2001 |

* cited by examiner

*Primary Examiner* — Yan Lan
(74) *Attorney, Agent, or Firm* — Banner & Witcoff, Ltd.

(57) ABSTRACT

The invention relates to a flexible tube head (40, 40') comprising a dispensing port which is defined by an edge (41, 41') and a shoulder (42, 42'), the shoulder connecting the edge to the flexible skirt (30) of the tube. The invention is characterized in that it comprises an electronic component (20) which can be used for the electrically contactless exchange of information with a read or read/write device, normally a Radio Frequency Identification (RFID) type component.

17 Claims, 3 Drawing Sheets

FLEXIBLE TUBE COMPRISING AN ELECTRONIC COMPONENT

CROSS REFERENCE TO RELATED APPLICATIONS

This application is a divisional application of U.S. Ser. No. 10/596,067 filed May 26, 2006, which is incorporated by reference, which application claims, under 35 USC §119, the benefit of priority of the filing date of Patent Cooperation Treaty patent application, Serial Number PCT/FR2004/003004, filed on Nov. 24, 2004, which is incorporated herein by reference, wherein Patent Cooperation Treaty patent application Serial Number PCT/FR2004/003004 was not published under PCT Article 21(2) in English.

This application also claims, under 35 USC §119, the benefit of priority of the filing date of French patent application, Application No. FR 03 13999, filed on Nov. 28, 2003, which is incorporated herein by reference. This application also claims, under 35 USC §119, the benefit of priority of the filing date of French patent application, Application No. FR 04 00644, filed on Jan. 23, 2004, which is incorporated herein by reference.

TECHNICAL FIELD

This invention relates to flexible plastic tubes, and more specifically tubes which are to be subjected to logistical monitoring, for themselves and/or for the products that they contain.

The invention is advantageously applicable not only to the logistical monitoring of these tubes before their delivery to the packaging clients, but also to the monitoring of the products that they contain, as the latter are generally of greater value than the tubes and are therefore subject to counterfeit acts.

BACKGROUND OF RELATED ART

Flexible plastic tubes can already contain information entered by the flexible tube manufacturer during the production of the tube. Thus, application JP2003-165552 (LION Corp.) discloses a flexible tube equipped—near the final weld—with a bar code or a decoration representing a registered trademark for detection of the product name. The information can, if necessary, be discreet, for example if the printing is performed with thermochromic or "security" inks detectable only under heat, ultraviolet radiation, and so on.

Such techniques require prior knowledge of the product information when the tube is produced. Therefore, it is not possible to characterise a product intended to be packaged in a standard tube that can be used for other products. For example, if a decoration is to be made using UV inks, it can be done during production of the tube, either on the web for laminated tubes, or on the extruded cylindrical body (plastic tubes) with conventional printing devices. However, once the tube has been delivered to the packaging client, the information can no longer be modified, unless the client is equipped with expensive printing devices. In practice, it is therefore difficult if not impossible to provide additional information, encoded or not, on the tube once it has been produced and delivered to the packager.

A known technique for overcoming this problem consists of printing a label containing the desired information, encoded or not, and placing it either on a package that contains the flexible tubes delivered to the packager (for example, for checking the tubes), or directly on the skirt of the flexible tube (for example, for monitoring the product contained in the tubes). However, an important problem is raised by the use of a label: it is very easy to remove it and thus separate the information that it contains from the product that it is supposed to accompany.

Patent application KR2003-025624 (ID TECK Co Ltd) discloses a cap equipped with a contactless electronic circuit that makes it possible, by means of remote read and write devices, to prevent counterfeiting of the product contained in the container closed by the cap. Due to its bulk, such a cap appears to be unsuitable for closing a flexible tube of standard size (diameter of the skirt typically between 15 and 60 mm, diameter of the neck typically between 5 and 15 mm). Moreover, once the container is open, the cap can easily be lost or exchanged. In this case, again, there is a risk of separation between the information and the product with which it is associated.

Patent EP 0 697 342 discloses a flexible tube provided with an antitheft device, consisting of a passive field-disturbance element inserted between the layers of a multilayer structure inserted on the flexible tube (multilayer insert going from the skirt to the shoulder, multilayer lid, etc. . . . ).

German patent application DE 102 18 417 (TUBEX) discloses a dispenser consisting of a flexible tube overmolded with a flip-top cap assembled so as to be substantially permanent on the head of the tube, which dispenser is provided with a transponder or magnetic band-type electronic module placed, typically by means of a support acting as a label, in a location inaccessible from the head.

The applicant aims to propose a technical device making it possible to ensure monitoring of the production of the tubes, and to offer the packaging clients the possibility of providing—after production of the tube—reliable information, encoded or not, on the product contained in the tube, regardless of whether the latter is equipped with a flip-top cap, and without the risk of losing the information throughout the life of the tube.

BRIEF SUMMARY OF THE INVENTION

A first object of the invention is a flexible plastic tube head including a dispensing aperture defined by an edge and a shoulder connecting the edge to a flexible skirt, characterised in that it comprises, set in the mass of the plastic material forming the head, an electronic module intended to exchange information in a contactless manner with a read and or read/write device outside of the tube.

The electronic component makes it possible to exchange information with an external device such as the type provided, for example, in smart cards, in particular RFID (Radio Frequency Identification) electronic components, which are described in detail below. This information can relate to the tube itself or to the product contained in the tube. Since the component is set in the mass of the plastic material forming the head, it can be used in an early stage of the production and be used for monitoring the production of the tube, upon production of the head, by indicating, for example, the plastic materials used, the skirt structure used, the presence of specific additives in the material of the head or the skirt, and so on.

Once the tube has been produced and delivered to the packager, the electronic component can also be used to enable the packaged product to be traced (origin of its components, conditions of production, storage before first opening, etc. . . . ).

It is also possible to consider self-contained electronic components, for example, equipped with their own energy source and capable of performing functions actuated for example by information resulting from data processed by this same component. For example, this component could, on the basis of the measurement programmed remotely or controlled by a parameter related to the product or the packaging, actuate the display of information on the product or the packaging on the external wall of the package, for example by means of a coloured reagent or a diode or liquid crystal screen.

The head of the tube has a dispensing aperture and a skirt, which dispensing aperture is defined by an edge connected to the skirt by a shoulder. The edge can be supported by the cylindrical wall of a neck intended to receive a cap, which neck is connected to the skirt by a shoulder having a substantially general conical shape. However, as in application WO 02 08079, it is possible for the tube head to have no cylindrical neck, and for the dispensing aperture to be placed, for example, at the base of a closure superimposed on the tube and connected to a cap by a hinge. In such a case, the base connects the edge defining the aperture to the flexible skirt and also serves as a shoulder.

The tube head includes the electronic component, which is advantageously placed in the thickness of the shoulder or in that of the cap, if it exists.

The edge of the aperture and the shoulder are preferably, at least over a portion of their thickness, made in one piece by molding the same plastic material, and the electronic component is set within the plastic material. This makes it possible to produce a shoulder with perfect continuity of the material between the skirt and the dispensing aperture in all or some of the thickness of the shoulder, and to simplify the production: it is not necessary to produce an intermediate part containing the component, transfer, assemble and then weld it to the rest of the tube.

An RFID system includes a transceiver—which controls the data acquisition and communication system—connected to an antenna and an RFID component which consists of a transponder connected to an antenna. The transponder is a radiofrequency identification label electronically programmed to automatically transmit a signal in response to an interrogation signal that it receives. The antenna of the RFID component is a conductor connected to the label. It receives radio signals that activate the transponder in order to write or read data. The antenna can have a wide variety of forms. In general, it is in the form of coils printed with a conductive ink on a plastic support (typically an epoxy resin or a saturated polyester, for example, polybutylene terephthalate) to which the transponder is also attached. The coils can have a generally circular or polygonal shape, typically square or rectangular. In the latter case, when the length is notably greater than the width, the antenna has an overall elongate form: we will hereinafter refer to it as a "linear antenna" or an "elongate antenna". The connections between the transponder and the branches of the antenna are generally protected by a layer of a plastic material, in general an epoxy resin, forming an added thickness.

The electronic component is preferably placed at the level of the shoulder of the tube, within the plastic material forming the head so as to prevent contact of the antenna and the label with the product that the tube is intended to contain. It is set in the mass, preferably without the use of adhesive materials, for example, during injection molding of the head. The conditions for placing the component in the cavity of the injection mold are dependent on the chosen shape of the antenna. Some of these are described in the examples below.

Another object of the invention is a method for producing flexible tube heads characterised in that an electronic module is used, which is capable of exchanging, without electrical contact, information with a read and/or a read/write device, typically an RFID-type electronic component, in that the electronic component (hereinafter referred to as a "chip") is placed inside the cavity of the mold intended to form the head, then the head is molded, with the plastic material flowing so that it encloses the chip, thus making the head and chip assembly inseparable.

The plastic material is preferably injection molded in the cavity of the mold. Compression molding can also be performed if the electronic components used are solid enough to be capable of resisting the mechanical stresses caused by this type of formation. Regardless of whether the molding is performed by injection or by compression, the component is deposited into the cavity of the mold intended to form the head. The latter includes at least two portions that are mobile with respect to one another: the die, of which the impression defines the external surface of the shoulder and the neck, and the punch, of which the head defines the internal surface of the shoulder and the neck. Very often, the neck must have a screw thread on its external wall, which makes it necessary to use a die which itself consists of a plurality of mobile portions which move away from one another—for example by radial movements—so as to facilitate the stripping of the threaded portion.

To prevent any risk of chemical incompatibility with the product intended to be packaged by the tube, it is desirable to attach this component without the use of adhesive. It is desirable in this case to find a geometric chip configuration and a location in the mold cavity so that the chip will not have a tendency to move or be deformed during the molding. The examples given below show two embodiments in which the electronic component withstands the plastic material injection molding operation without substantial movement or deformation.

The electronic component is preferably deposited on the convex conical surface of the punch head, with the molding device being arranged so that the punch is located below the die. The electronic component can thus be brought above the punch head and deposited by simple gravity.

The plastic material used for the molding of the head is the plastic material normally used, that is typically high-density, low-density or medium-density polyethylene. The injection molding is preferably performed at a temperature between 240 and 250° C.

A component having a total thickness (support+added thickness formed by the weld protection layer) of less than 400 microns is chosen so that the component does not come into contact with the outside or the inside of the tube. In this way, it is not necessary to modify the usual thickness of the shoulder of a standard flexible tube.

The electronic components commonly offered on the market are made with epoxy-type thermosetting resin supports. They can have all possible dimensions. If the constraints associated with the range of reception of the information are not too limiting, it is possible to directly use commercially-available small components, which are "embedded" in the mass of the injected plastic material. Nevertheless, the precise positioning of such small electronic components may present a problem since it is necessary to avoid using adhesive materials, enabling, for example, the component to be set in a specific location of the mold.

Thus, it appears to be advantageous to choose larger components, therefore having a greater frequency reception range. These electronic components must have a support capable of resisting mechanical and thermal stresses caused by the plastic material which melts during the molding process. The setting of the component in the plastic material of the head can be purely mechanical: the goal is simply to embed the periphery of the support in the plastic material overmolded around the component. The setting of the electronic component can also be performed by welding, in which case a support consisting at least partially of a material that is melt-compatible with the plastic material of the head, typically a high-density polyethylene or a polypropylene, is used. This external layer can cover the antenna portion obtained by serigraphy printing. It can also cover the other side of the support. The component is preferably placed in the impression of one of the molding tools, with the external layer made of a plastic material melt-compatible with the plastic material of the head being placed in contact with the engraved surface of the impression of the mold tool. In this way, the external layer, after molding, is in contact with the product contained inside the flexible tube and provides a protective barrier for the electronic component.

In a preferred embodiment, the electronic component has a support with one side made of a thermoplastic material and the other side that is covered by the antenna and also covered—aside from its periphery—with an adhesive material enabling it to adhere to a distribution band. Thus, before molding, the component is brought by a movement of the band toward the mold, is then detached by simple peeling of the band opposite the molding cavity, and descends—by gravity or by means of a suction cup, for example—into the engraving of the mold, with the thermoplastic material side resting on the engraved surface of the mold. During the molding process, the molten plastic material covers the side comprising the antenna and the adhesive layer: as the periphery of the component is not covered with the adhesive material, it is embedded in the head, in close contact with the plastic material of the head.

To ensure the precise and repeatable placement of the component in the mold, without the use of adhesive materials, it is advantageous to use an electronic component on a disk-shaped support having a hole at its centre placed around the projection of the punch, which serves to shape the inside of the neck.

Another possibility, in particular when the electronic component does not have a disk shape with a hole at its center (it can, for example, have the shape of an arc which extends of 90°, 120° or 180°), consists of engraving an O-ring notch, with an angular extension slightly greater than that of the component, over the upper portion of the punch. In this way, the notch acts as a recess which guides and facilitates the removal, then helps to hold the component before the closing of the die prior to the molding operation. During the actual molding operation, the impression comprising the notch facilitates the flow of the plastic material under the support of the component, which ensures the enclosure of the periphery thereof.

Another object of the invention is a flexible tube including a head and a flexible skirt, characterised in that the head comprises, preferably at the level of the shoulder, an electronic module capable of exchanging, without electrical contact, information with a read or a read/write device, typically an RFID (Radio Frequency Identification) electronic component.

The head is welded to the skirt either after it has been molded or during the molding process. In the latter case, the head is overmolded on the skirt: the input heat from the injected plastic material is adequate to melt the plastic material of the end of the skirt which is intended to be attached to the head.

To overmold the tube head on a skirt, the skirt is fitted around the so-called punch portion of the mold and is compressed so that one end of the skirt overflows and is enclosed in the molding cavity defined by the head of the punch and the impression of the die. The plastic material—under the effect of the injection or the compression—comes into contact with the end of the skirt. At a temperature above their respective Vicat softening points, the plastic materials of the head and the skirt become closely welded to one another without any additional heat or material. After being held lightly under pressure (on the order of several seconds) and cooled, the head is molded into the desired dimensions and welded firmly to the skirt.

Another object of the invention is a method for producing a flexible tube equipped with a tube head in which the head is overmolded on the end of the skirt, characterised in that an electronic module capable of exchanging information, without electrical contact, with a read or read/write device, typically an RFID electronic component is placed on the head of the punch, in contact with the end of the skirt which overflows into the molding cavity.

In this embodiment of the invention, the overflowing end of the skirt is used to "ground" the electronic component comprising a transponder and an antenna: it is placed on the head of the punch, in contact with the end of the skirt. The electronic component can be a chip on a relatively heavy and rigid epoxy-type support, so that the supply of chips can be provided by simple stacking: a mold is placed opposite the stack, the chip at the base of the stack is detached and falls by gravity into the molding cavity, then comes into contact with the end of the skirt. It is also possible to choose a linear antenna, preferably on a thermoplastic material support. The chip is placed by an automated gripping device. It is flexible enough, at the time of placement, to follow the curvature imposed by the end of the skirt. Also preferably, the longest possible linear antenna (having a length at least equal to half the diameter) is chosen so as to reduce the stress and movements caused when the molten plastic material arrives. The antenna's detection range can be adjusted if necessary by increasing the number of coils.

DETAILED DESCRIPTION OF THE INVENTION

Figure 1:
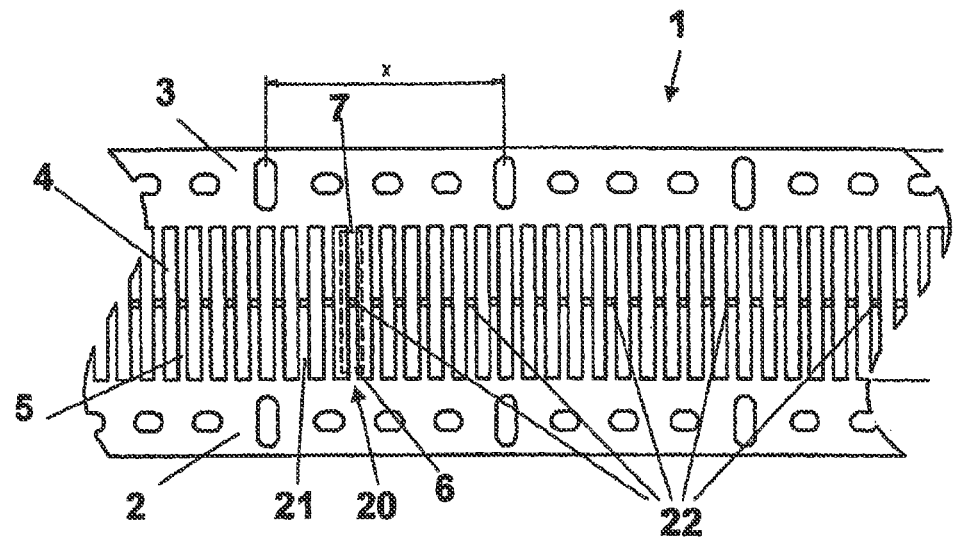
FIG. 1 show a band used to deposit elongate chips at high speed in the cavity of a device enabling tube heads to be molded.
Figure 2:
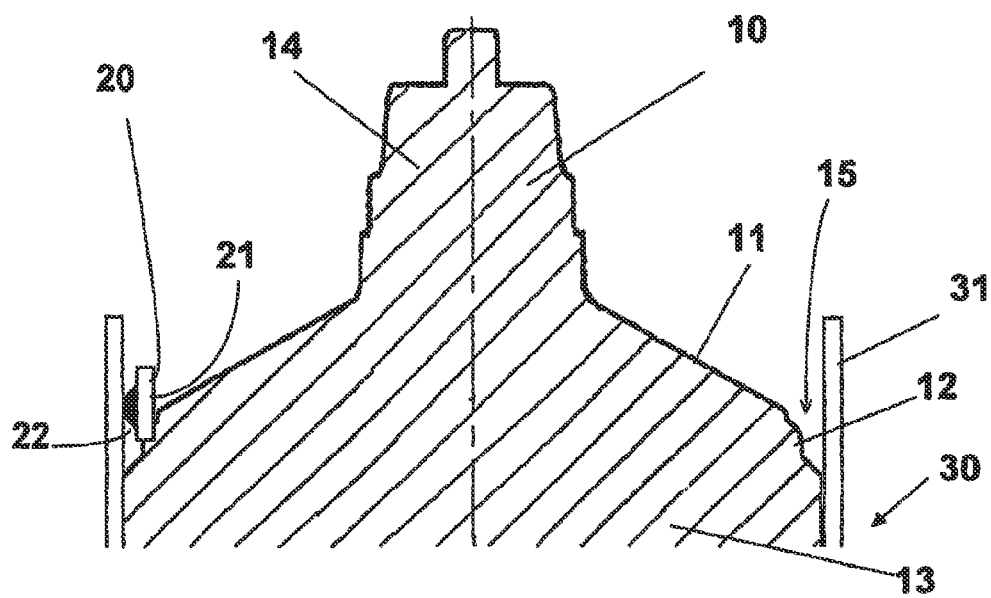
FIG. 2 shows an axial cross-section of a portion of this molding device: the mandrel is equipped with a skirt before molding of the head, and an elongate chip has been deposited on the mandrel head.
Figure 3:
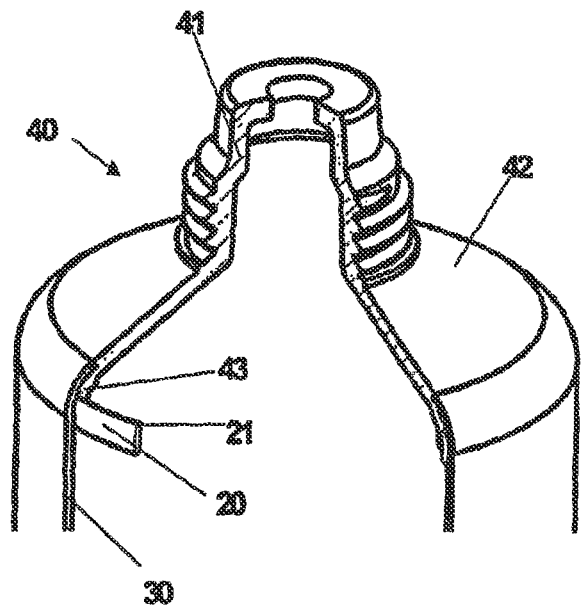
FIG. 3 shows an axonometric view—including a partial diametral cross-section of the tube head overmolded on the skirt and including the elongate chip in the thickness of the shoulder.

Example 1—Tube Head Overmolded on a Skirt and Equipped with an Elongate Electronic Component (FIGS. 1 to 3)

In this example, the particular geometric configuration utilized is that imposed by the overmolding of the head on the skirt and for which the end of the skirt must overflow into the cavity of the mold. This overflowing skirt end is used as a stop serving as a bearing surface for the chip.

FIG. 1 shows a band used to supply the molding device with elongate chips. The band is made of high-density polyethylene. Its edges 2 and 3 are perforated so as to facilitate regular forward movement. Its central portion is equipped with a large number of rectangular perforations 4 separating ligaments 5 on which elongate antennas have been printed by serigraphy, and at the middle of which transponders have been deposited. The transponders are connected to the antennas by means of welds protected by projections 22. Once cut at its two ends 6 and 7, the ligament becomes an elongate electronic component 20 with a support 21 and a transponder lightly protected by a relief 22. The removal of the residual constraints resulting from the cut causes the elongate electronic component 20 to spontaneously acquire a certain curvature that facilitates its placement in the cavity of the mold. Typically, for the elongate chip, a length between one and three quarters of the perimeter of the skirt, preferably between 40 and 60%, is selected.

FIG. 2 shows an axial cross-section of the mandrel 10 on which the elongate chip 20 has been deposited. The mandrel has a cylindrical body 13 around which the skirt 30 is fitted, and a head including a projection 14 serving to define the internal surface of the neck and a convex conical wall 11 serving to define the internal surface of the shoulder of the tube. The elongate chip 20 is deposited near the peripheral shoulder 12 which, with the overflowing end 31 of the skirt, defines an annular groove 15. This peripheral shoulder 12 corresponds to the added thickness at the level of the junction between the head and the skirt. The elongate chip 20 comes into contact with the inner wall of the skirt. During the injection, it comes into contact over its entire length with the overflowing end of the skirt before the latter softens from the heat.

FIG. 3 shows an axonometric view—including a partial diametral cross-section—of the tube head 40. It has a neck 41 and a shoulder 42 connecting the neck to the skirt 30. The elongate chip 20 located in the thickness of the shoulder can be found at the level of the added thickness corresponding to the junction between the head and the skirt.

Example 2—Tube Head Equipped with an Electronic Component in the Shape of a Holed Disk In this example, the head can be either molded separately or overmolded on the skirt.

Figure 4:
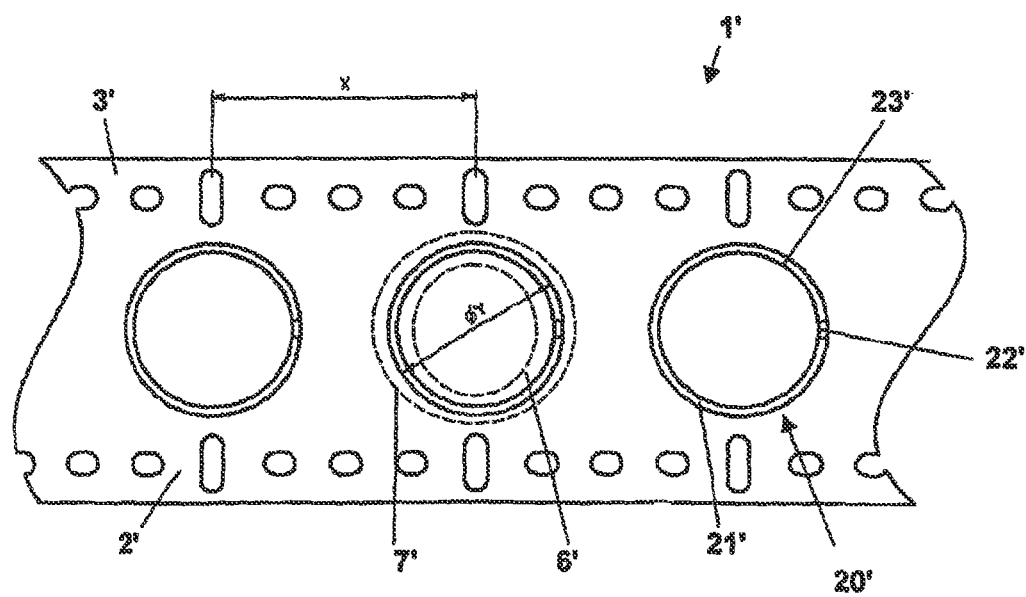
FIG. 4 shows a band used to deposit holed disk-shaped chips at high speed in the cavity of a device enabling tube heads to be molded.

FIG. 4 shows a band 1' used to supply the molding device with chips in the shape of holed disks. The band is made of high-density polyethylene. Its edges 2' and 3' are perforated so as to facilitate regular forward movement. Its central portion is equipped with a large number of antennas 23' having an overall circular shape printed by serigraphy and connected to transponders. The band 1' is cut along two circumferences 6' and 7' surrounding the circular antenna. The holed disk-shaped electronic component 20' thus obtained has a support 21' on which the antenna 23' is printed and which includes a transponder itself connected to the antenna by means of welds protected by a relief 22'.

To have chips that can be used regardless of the size and shape of the tube (circular cylindrical, elliptical, polygonal skirt, etc. . . . ), the diameter of the internal cutting circumference is selected so that it is greater than the largest standard diameter of the dispensing aperture, and the diameter of the external cutting circumference is selected so that it is smaller than the smallest standard flexible skirt diameter. Also preferably, the transponder and its protective relief 22' are placed closer to the internal cutting circumference 6' if the relief is oriented upward and, conversely, closer to the external cutting circumference 7' if the relief is oriented downward. In this way, the relief 22' for protecting the weld, not being in continuous contact with the wall of the tool during molding, is protected from the mechanical stresses caused during the mutual closing of the two parts of the tool.

Figure 5:
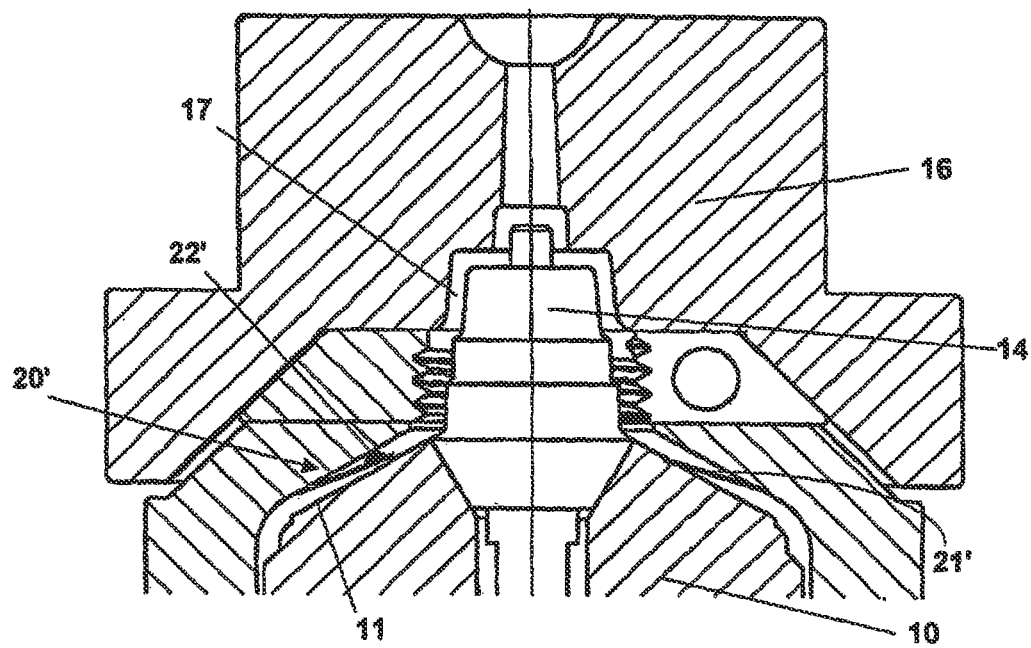
FIG. 5 shows an axial cross-section of this molding device: the mandrel is equipped with a skirt before molding of the head, and holed disk-shaped chip has been deposited on the convex conical surface of the mandrel head.

FIG. 5 shows an axial cross-section of the mold, including the mandrel 10 and the matrix 16. The holed disk-shaped chip 20' has been deposited around the projection 14, on the convex frusto-conical side 11 of the head of the mandrel 10. It can be noted that after the die and punch close to form the molding cavity 17, the component must adopt a frusto-conical shape in order to adhere inside the cavity. This transformation may result in a shrinkage of the portion close to the internal diameter and an expansion of the portion close to the external diameter. With a particularly rigid support, a thick layer of epoxy resin or even, as in the present case, a relatively thick support made of high-density polyethylene, it is advantageous to provide radial slots at least in the area close to the internal diameter so as to enable the portions thus isolated from one another to move freely, at the risk of partially overlapping during the shrinkage. If, as in alternative 1 described below, the support remains thin and flexible, the cone frustum can be formed without damage: ripples are admittedly created but remain embedded in the mass of the plastic material of the head.

Figure 6:
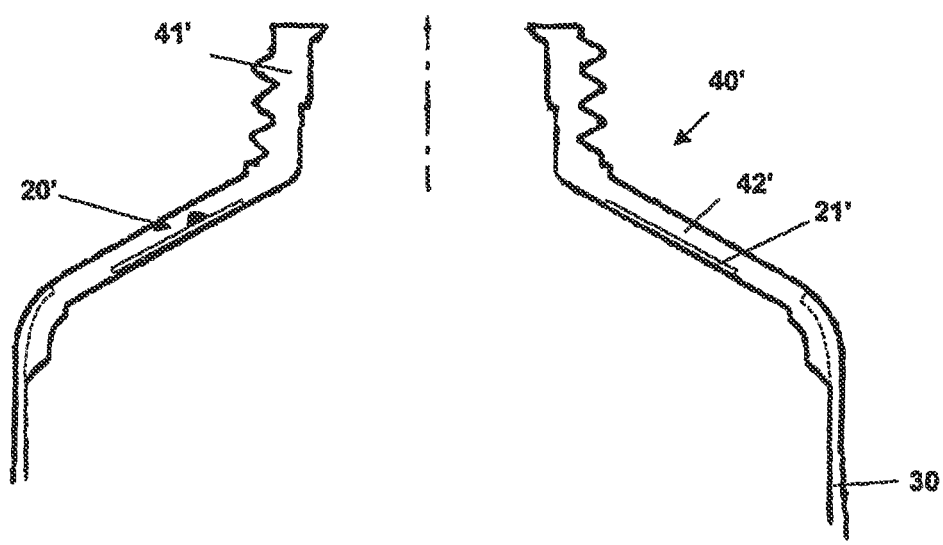
FIG. 6 shows an axial cross-section of the tube head overmolded on the skirt and including the holed disk-shaped chip in the thickness of the shoulder.

FIG. 6 shows an axial cross-section of the tube head 40' overmolded on the skirt. It has a neck 41' and a shoulder 42' connecting the neck to the skirt 30. The chip can have a holed disk shape 20' embedded in the thickness of the shoulder.

Alternative 1 of Example 2

This alternative relates to an embodiment slightly different from that described above.

Instead of using the band of FIG. 4, a distribution band is used on which the components, already produced and cut to the right size, are glued by an adhesive layer facilitating their detachment by simple peeling. In this case, the support can be thinner and made of a more flexible material (low-density polyethylene, for example). The side that supports the antenna is covered with the adhesive material except at its periphery. Thus, before molding, the component is brought by forward movement of the distribution band to the mold, is then detached by simple peeling from the band opposite the molding cavity, and descends—by gravity or by means of a suction cup, for example—into the engraving of the mold, with the side made of thermoplastic material resting on the engraved surface of the mold. During the molding operation, the molten plastic material covers the side comprising the antenna and the adhesive layer: as the periphery of the component is not covered with the adhesive material, it is embedded in the head, in close contact with the plastic material of the head.

Alternative 2 of Example 2

This alternative also relates to another embodiment, different from those described above.

Instead of using the components described in FIG. 4 or in the first alternative, components or inserts that must for other reasons be inserted into the tube head, are used: thus, for example, one-piece inserts made of PBT (polybutylene terephthalate) or of thermoformed multilayer materials which are deposited at the level of the shoulders so as to reduce the oxygen or water vapour permeability of the head. For example, a multilayer barrier, such as that described in EP-B-0 524 897, can act as a support for the electronic component: the antenna is printed by serigraphy on the side opposite that intended to be exposed to the inside of the tube, with the impression preferably being performed in the area intended to remain in the shoulder, the transponder is deposited and the welding is performed so as to connect the transponder to the antenna. Next the insert is produced by thermoforming.

Once produced, the chip-inserts are collected and stacked. In this way, the supply of chip-inserts in the tube head molding device can be provided in the same way as for the barrier inserts: a mold is placed opposite the stack of inserts, the insert located at the base of the stack is detached and falls by gravity into the molding cavity. This technique is already well known and applied for barrier inserts inserted into toothpaste tube heads.

The production method incorporates the insertion of the electronic component in the steps at high-speed: there is no need to repeatedly add the chip. The insertion is performed at a speed compatible with industrial speeds, and insert depositing devices already exist, for example for depositing barrier inserts in toothpaste tubes.

The chip is immersed in the mass of the plastic material forming the head of the tube: the component can be completely discreet and there is no problem of incompatibility with the product to be packaged.

What is claimed is:

1. Flexible tube head of a tube, the tube head including an aperture defined by an edge and a shoulder connecting the edge to a flexible skirt of the tube, the tube head comprising an electronic component arranged and set in a mass of plastic material forming the tube head so that the electrical component has no tendency to move or be deformed during molding, the electronic component intended to exchange, without electrical contact, information about the tube, tube contents, or both with a read or read/write device outside of the tube, said electronic component set entirely within the mass along the inside of the tube such that the periphery of a support of the electronic component is enclosed by the plastic material forming the tube head, wherein the electronic component cannot be seen on the outside of the tube and wherein no adhesive is used to attach the electronic component in order to prevent contact of an adhesive with a product packaged in a tube comprising the tube head.

2. Tube head according to claim 1 wherein the electronic component is set in the mass of the plastic material forming the tube head at the level of the shoulder of the tube.

3. Tube head according to claim 1 wherein the electronic component has a total thickness of less than 400 microns.

4. Tube head according to claim 1 wherein a support of the electronic component comprises at least partially of a material that is melt-compatible with the plastic material forming the head.

5. Tube head according to claim 4 wherein the support of the electronic component is made of polyethylene or polypropylene.

6. Tube head according to claim 1 wherein the electronic component is an RFID-type electronic component.

7. Tube head according to claim 1 wherein the electronic component has an elongated shape.

8. Tube head according to claim 1 wherein the electronic component has holed disc shape.

9. Tube head according to claim 1 wherein the electronic component is arranged at the junction between the tube head and the flexible skirt.

10. Tube head according to claim 1 wherein the electronic component is arranged around the shoulder of the tube head and it is embedded in the mass of the plastic material forming the head.

11. Flexible tube including a tube head and a flexible skirt, wherein the tube head includes an aperture defined by an edge and a shoulder connecting the edge to the flexible skirt and comprises an electronic component arranged and set in a mass of plastic material forming the tube head so that the electrical component has no tendency to move or be deformed during molding, the electronic component capable of exchanging, without electrical contact, information on the tube, tube contents, or both with a read or read/write device, said electronic component being set entirely within the mass along the inside of the tube such that the periphery of a support of the electronic component is enclosed by the plastic material forming the tube head, wherein the electronic component cannot be seen on the outside of the tube and wherein no adhesive is used to attach the electronic component in the tube head order to prevent contact of an adhesive with a product packaged in the tube.

12. Flexible tube according to claim 11 wherein the electronic component is an RFID electronic component.

13. Flexible tube according to claim 11 wherein the electronic component is set in the mass of the plastic material forming the tube head at the level of the shoulder of the tube.

14. Flexible tube according to claim 11 wherein the electronic component has an elongated shape.

15. Flexible tube according to claim 11 wherein the electronic component has holed disc shape.

16. Flexible tube according to claim 11 wherein the electronic component is arranged at the junction between the tube head and the flexible skirt.

17. Flexible tube according to claim 11 wherein the electronic component is arranged around the shoulder of the tube head and it is embedded in the mass of the plastic material forming the head.

* * * * *